United States Patent
Hsu

(10) Patent No.: US 6,339,919 B1
(45) Date of Patent: *Jan. 22, 2002

(54) RAKE HAVING A GRIPPING MECHANISM

(76) Inventor: Shih Hao Hsu, P.O. Box 63-99, Taichung 406 (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,391

(22) Filed: Jan. 18, 2000

(51) Int. Cl.⁷ .................................................. A01D 7/00
(52) U.S. Cl. ................. 56/400.2; 56/400.17; 56/400.19
(58) Field of Search ............................ 56/342, 400.01, 56/400.04, 400.16, 400.17, DIG. 18, 400.11, 400.12, 400.19, 400.2; D8/13; DIG. 1, DIG. 7; 135/71, 72, 73; 294/50.6, 50.8, 50.9, 19.1; 15/263, 199.2

(56) References Cited

U.S. PATENT DOCUMENTS

| | | | | |
|---|---|---|---|---|
| 678,519 A | * | 7/1901 | Robinson | 56/400.19 |
| 2,840,978 A | * | 7/1958 | Spinosa | 56/400.04 |
| 2,902,815 A | * | 9/1959 | Gallo | 56/400.19 |
| 5,414,982 A | * | 5/1995 | Darnell | 56/400.19 |
| 5,440,868 A | * | 8/1995 | Darnell | 56/400.17 |
| 5,603,543 A | * | 2/1997 | Ratte | 294/19.1 |
| 5,927,058 A | | 7/1999 | Hsu | 56/400 |
| 6,101,799 A | * | 8/2000 | Darnell | 56/342 |

* cited by examiner

*Primary Examiner*—Thomas B. Will
*Assistant Examiner*—Nathan Mammen

(57) ABSTRACT

A rake has a rod rotatably engaged in a sleeve. Two tine heads are secured to the sleeve and the rod and rotatable relative to each other between an open position and a folded position. One of the tine head may be rotated relative to the other tine head by the rod. A spring is engaged between the tine heads for biasing the tine heads to the open position. A hand grip is secured to the rod for rotating the rod relative to the sleeve. A pole and a tube may further be secured to the rod and the sleeve.

2 Claims, 5 Drawing Sheets

RAKE HAVING A GRIPPING MECHANISM

BACKGROUND OF THE INVENTION

1. Field of the Invention

The present invention relates to a rake, and more particularly to a rake having a gripping mechanism.

2. Description of the Prior Art

The closest prior art of which the applicant is aware is his prior U.S. Pat. No. 5,927,058 to Hsu and comprises a foldable tine head for gripping tree leaves or the like. A complicated ratchet means is required to be used for operating the foldable tine head.

The present invention has arisen to mitigate and/or obviate the afore-described disadvantages of the conventional rakes.

SUMMARY OF THE INVENTION

The primary objective of the present invention is to provide a rake having as simplified gripping mechanism for grasping and holding tree leaves.

In accordance with one aspect of the invention, there is provided a rake comprising a sleeve, a first tine head secured on the sleeve, a rod rotatably received in the sleeve and including a first end extended out of the sleeve, and a second tine head rotatably engaged on the sleeve and rotatable from an open position to a folded position, the rod being secured to the second tine head for rotating the second tine head relative to the first tine head.

A biasing device is further provided for biasing the second tine head to the open position. A hand grip is secured to the first end of the rod for rotating the rod relative to the sleeve.

A pole is further secured to the rod, and a tube is further secured to the sleeve. The first end of the rod includes a first coupler, the pole includes a second coupler engaged with the first coupler for securing the rod and the pole together. The tube includes an annular swelling extended radially inward and engaged with the second coupler.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is an end schematic view of the rake;

DETAILED DESCRIPTION OF THE PREFERRED EMBODIMENT

Figure 1:
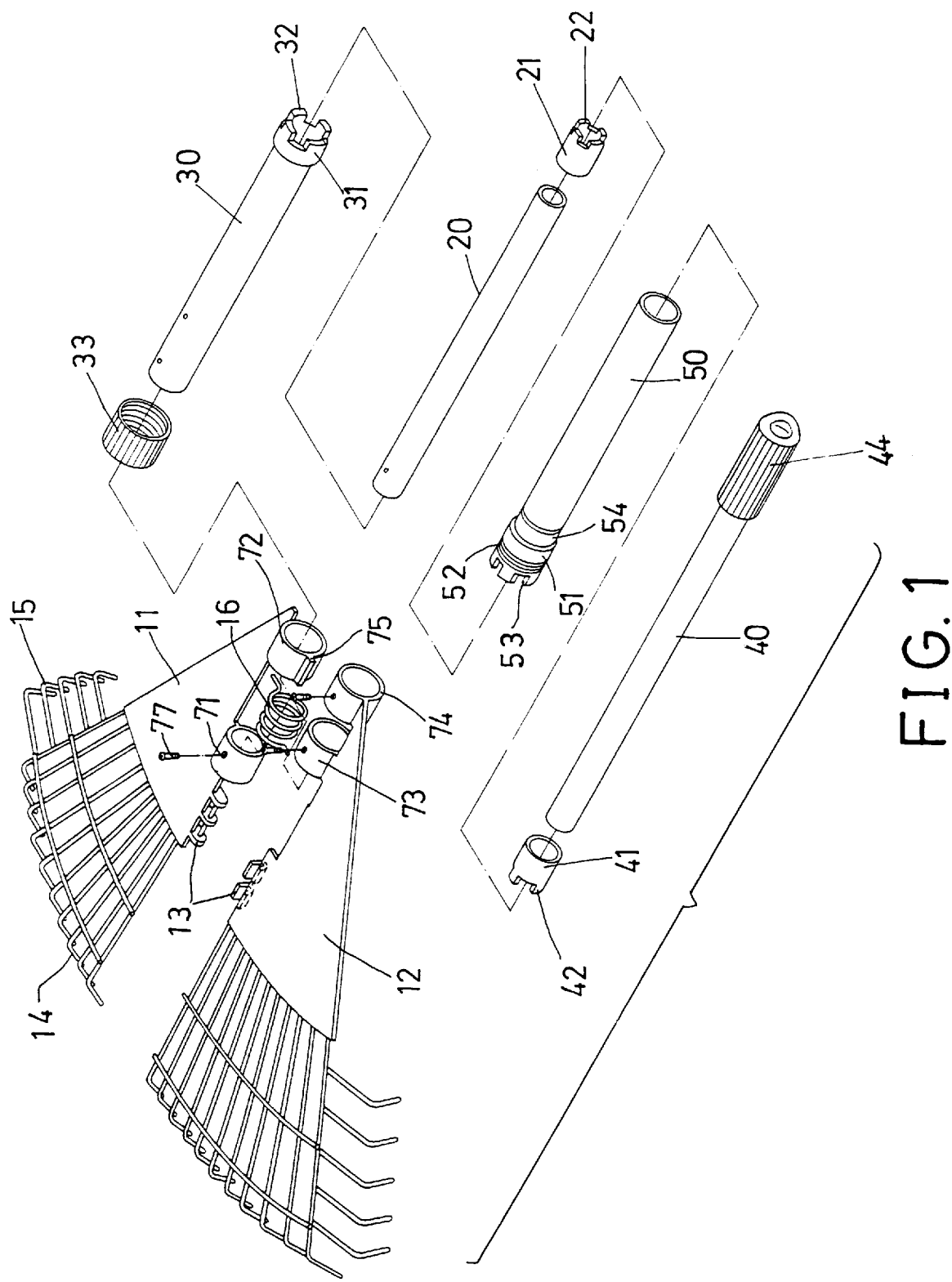
FIG. 1 is an exploded view of a rake in accordance with the present invention.
Figure 2:
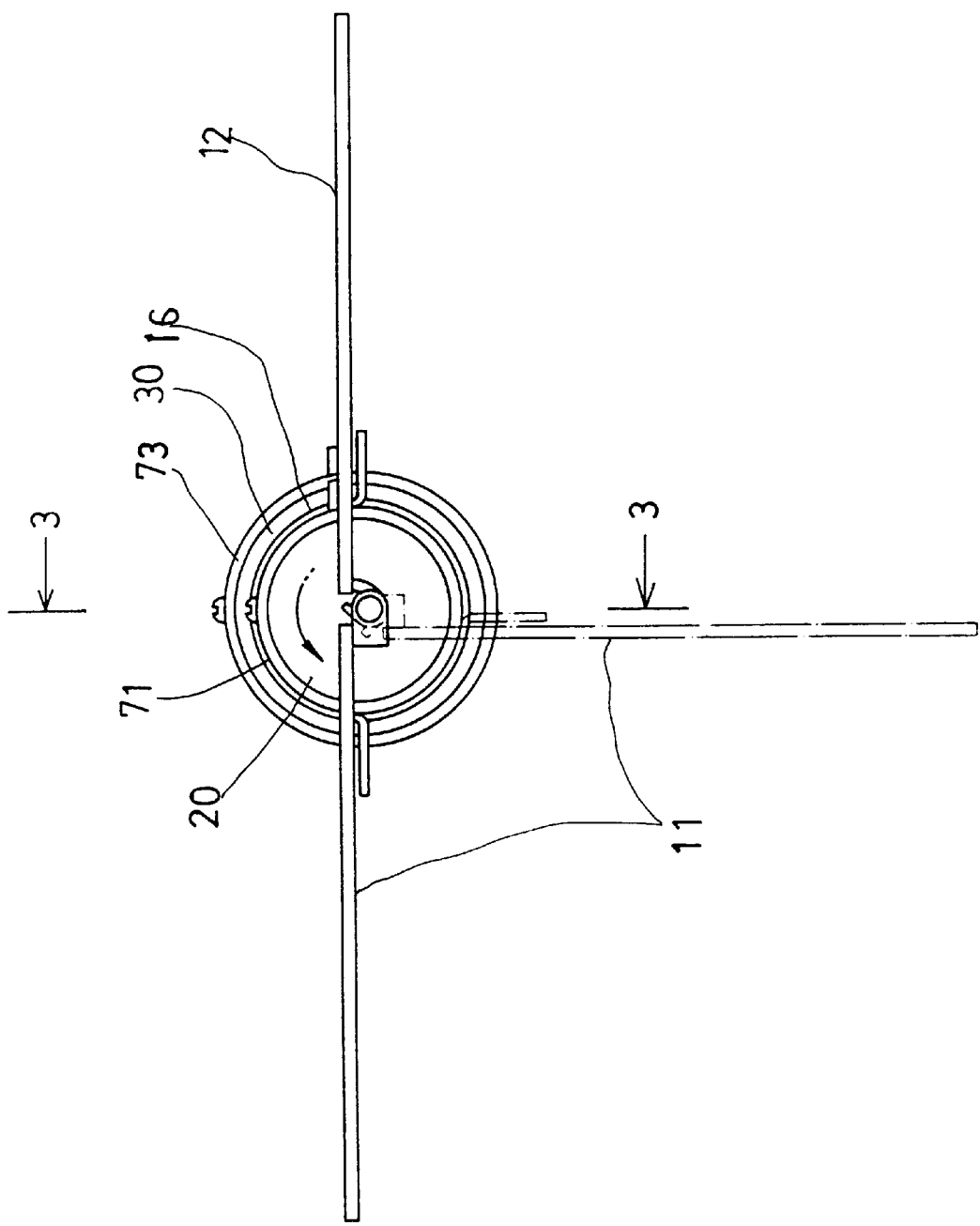
Figure 3:
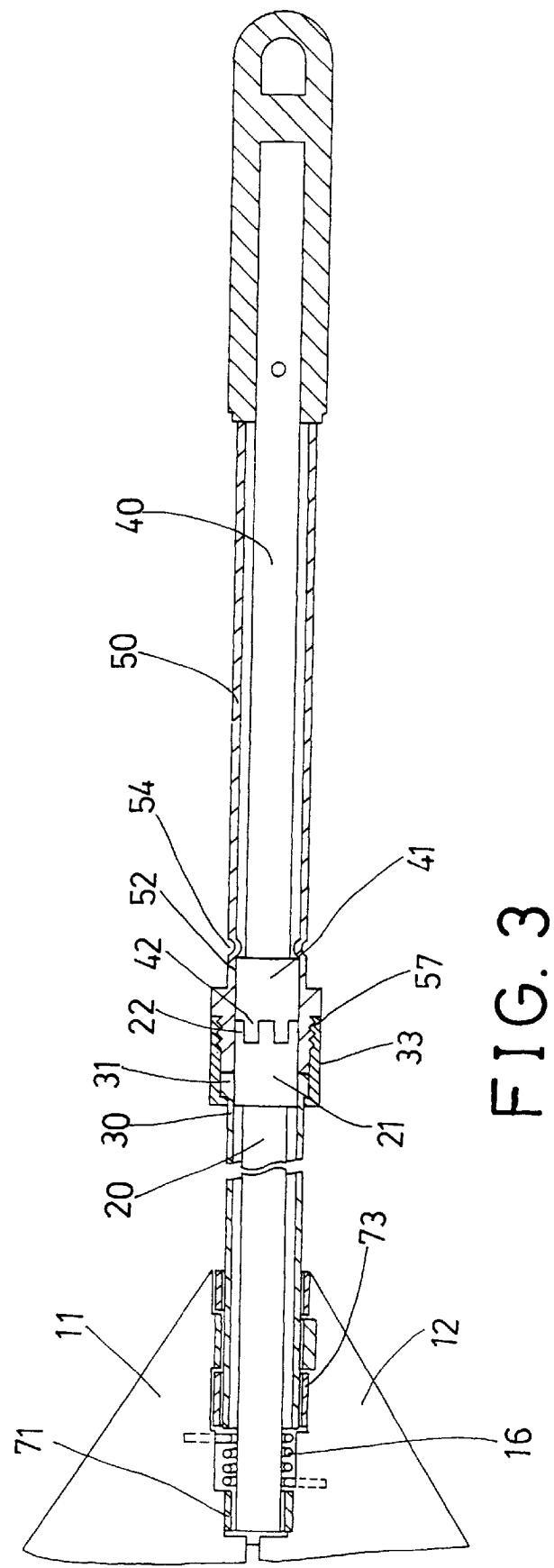
FIG. 3 is a cross sectional view taken along lines 3—3 of FIG. 2.
Figure 5:
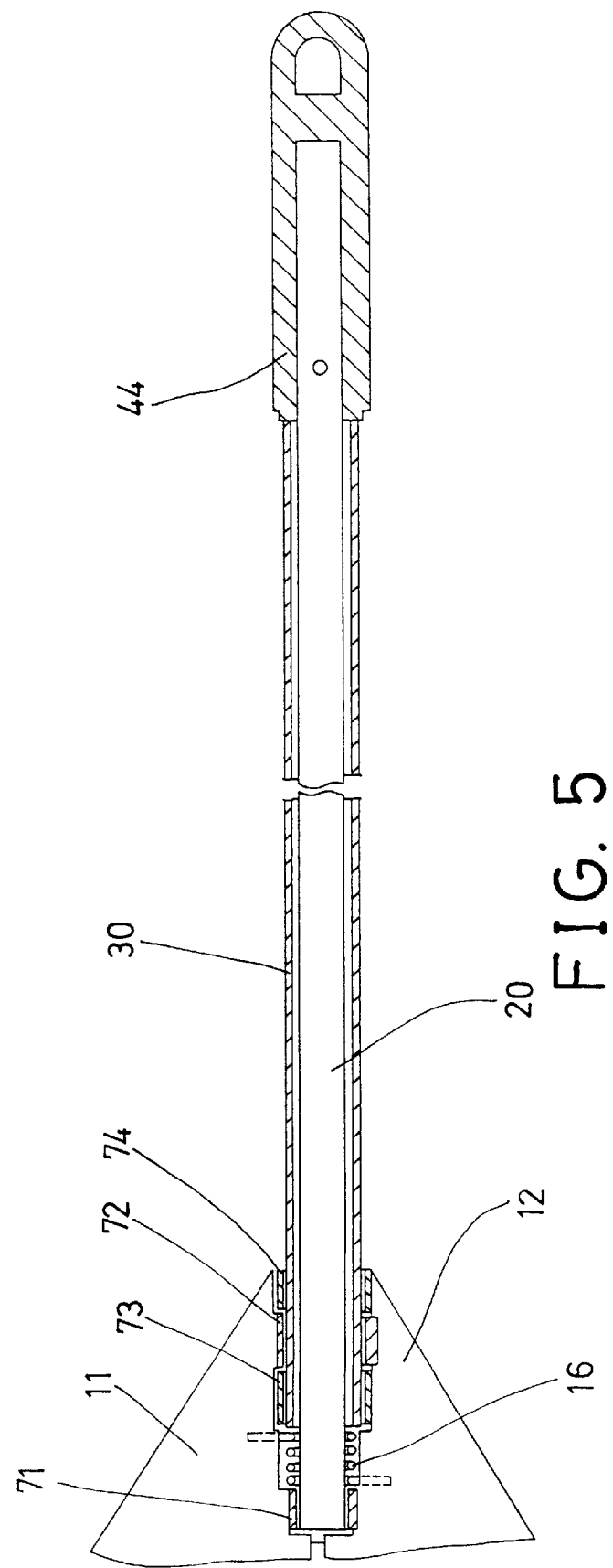
FIG. 5 is a cross sectional view similar to FIG. 3 showing the structure of the rake of FIG. 4.

Referring to the drawings, and initially to FIGS. 1–3, a rake in accordance with the present invention comprises a rod 20 rotatably engaged in a sleeve 30. The rod 20 includes a coupler 21 attached to the rear end thereof and having one or more teeth 22 formed and provided thereon. The sleeve 30 includes an annular flange 31 and a number of teeth 32 formed on the rear end thereof. The front portion of the rod 20 is slightly extended outward of the sleeve 30 (FIGS. 3, 5).

A tube 50 has an annular flange 51 and an outer thread 52 formed on the front end thereof and includes a number of teeth or notches 53 formed in the front end thereof for receiving or for engaging with the teeth 32 of the sleeve 30 and for allowing the tube 50 and the sleeve 30 to be rotated in concert with each other. A ferrule 33 is engaged with the annular flanges 31, 51 and threadedly engaged with the outer thread 52 of the tube 50 for solidly securing the tube 50 and the sleeve 30 together. The tube 50 includes an annular swelling 54 extended radially inward therefrom (FIG. 3).

A tine head 12 has two collars 73, 74 engaged on and secured to the sleeve 30 by fasteners such that the tine head 12 rotates in concert with the sleeve 30. Another tine head 11 has a collar 72 rotatably engaged on the sleeve 30 and engaged between the collars 73, 74 and includes the other collar 71 secured on the front end of the rod 20 by fasteners 77, for example, such that the tine head 11 may be rotated by the rod 20 about the sleeve 30 toward the other tine head 12 to a folded position as shown in dotted lines in FIG. 2. A spring 16 is engaged on the sleeve 30 and engaged with the tine heads 11, 12 for rotating the tine heads 11, 12 to the open position, as shown in FIGS. 3, 5 and as shown in solid lines in FIG. 2. The collar 72 includes a stop 75 for engaging with the tine head 12 and for maintaining the tine heads 11, 12 at the open position. An auxiliary hinge 13 is further provided for pivotally coupling the tine heads 11, 12 together. The tine heads 11, 12 each preferably includes a primary portion 14 and an auxiliary portion 15 for increasing the gripping effect of the rake.

Figure 4:
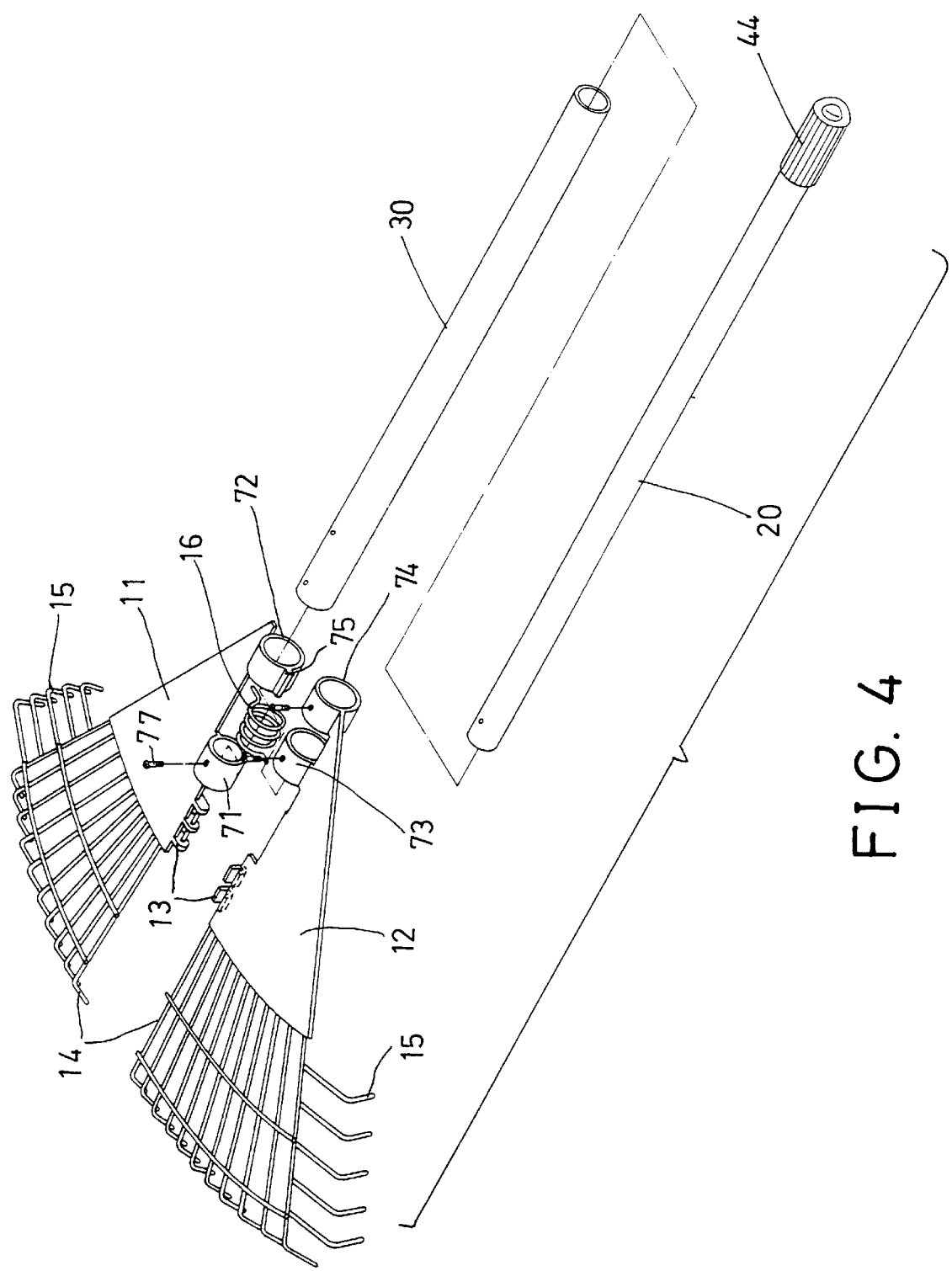
FIG. 4 is an exploded view illustrating the other application of the rake.

A pole 40 is rotatably engaged in the tube 50 and includes a hand drip 44 secured to the rear end thereof and includes a coupler 41 attached to the front end thereof and having one or more teeth 42 formed and provided thereon for engaging with the teeth 22 of the coupler 21 and for allowing the pole 40 and the rod 20 to be rotated in concert with each other. The annular swelling 54 of the tube 50 may engage with the coupler 41 for limiting the relative movement between the pole 40 and the tube 50. As shown in FIGS. 4 and 5, without the pole 40 and the tube 50, the rod 20 may be rotatable received in the sleeve 30 and the hand grip 44 may be directly secured onto the rod 20. The attachment of the pole 40 and the tube 50 to the rod 20 and the sleeve 30 is provided for extending the length of the rod 20 and the sleeve 30, and for allowing the rod 20 (and the pole 40) and the sleeve 30 (and the tube 50) to be folded in a compact configuration that is excellent for transportation and storing purposes.

In operation, as shown in FIGS. 3 and 5, the tine head 11 may be directly and easily folded toward the other tine head 12 against the spring 16 by the rod 20 with the hand grip 44, for gripping the tree leaves, for example. When the tine head 11 is released, the spring 16 may bias the tine heads 11, 12 to the open position again, and the stop 75 of the collar 22 may engage with the tine head 12 for maintaining the tine heads 11, 12 in the open position.

Accordingly, the rake in accordance with the present invention includes a gripping mechanism having a greatly simplified configuration for easily rasping and holding the tree leaves or the like and for facilitating the storing and transportation purposes.

Although this invention has been described with a certain degree of particularity, it is to be understood that the present disclosure has been made by way of example only and that numerous changes in the detailed construction and the combination and arrangement of parts many be resorted to without departing from the spirit and scope of the invention as hereinafter claimed.

I claim:
1. A rake comprising:

a sleeve, a first tine head secured on said sleeve, a rod rotatably received in said sleeve and including a first end extended out of said sleeve, a second tine head rotatably engaged on said sleeve and rotatable from an open position to a folded position, said rod being secured to said second tine head for rotating said second tine head relative to said first tine head, a hand grip secured to said first end of said rod for rotating said rod relative to said sleeve, and means for biasing said second tine head to said open position.

2. A rake comprising:

a sleeve, a first tine head secured on said sleeve, a rod rotatably received in said sleeve and including a first end extended out of said sleeve, said first end of said rod includes a first coupler, a second tine head rotatably engaged on said sleeve and rotatable from an open position to a folded position, said rod being secured to said second tine head for rotating said second tine head relative to said first tine head, a pole secured to said rod, said pole includes a second coupler engaged with said first coupler for securing said rod and said pole together, and a tube secured to said sleeve, said tube includes an annular swelling extended radially inward and engaged with said second coupler.

* * * * *